United States Patent Office 2,754,275
Patented July 10, 1956

2,754,275
POROUS SOLIDS AND THEIR PREPARATION

Jackson S. Boyer, Darby, Pa., assignor to Sun Oil Company, Philadelphia, Pa., a corporation of New Jersey No Drawing. Application February 24, 1951,
Serial No. 212,693

8 Claims. (Cl. 260—2.5)

This invention relates to a method for preparing rigid porous solid materials, and to the product thereby obtained.

According to the present invention, a rigid, porous solid material is prepared by heating a compact mass of solid urea or thiourea particles wetted with formalin or furfural, the heating being done under pressure not substantially exceeding atmospheric pressure, in order not to substantially compress the compact mass during heating. It has been found that such heating results in the compact mass assuming a unitary structure, and in the compact mass hardening through condensation of the urea or thiourea with the wetting liquid to give a unitary rigid porous solid.

The product obtained by the above-described method has a porous, honeycombed structure and is permeable to liquids and gases. It is highly resistant to heat. The product of the present invention can be made in a particular desired shape by shaping the compact mass of solid thiourea particles wetted with formalin or furfural before hardening the mass by application of heat.

In the method of the present invention, the compact mass of wetted solid particles can be prepared in any suitable manner. For example, particles of the solid material can be agitated with the liquid material to obtain uniform wetting of the particles and the mixture of solids and liquid then filtered to obtain a filter cake comprising the desired compact mass of wetted solid particles.

The particles of solid material used according to the present invention can vary widely in size. It is generally preferred that a major proportion of the mixture of particles used should be small enough to pass a 10 mesh U. S. Standard screen. When thiourea is used according to the invention, particularly good results are obtained when a major proportion of the particles are small enough to pass a 20 mesh U. S. Standard screen.

The formalin or furfural used according to the present invention can be any commercial or purified grade and can have added thereto if desired, though it is not necessary, a condensation catalyst to promote hardening of the compact mass upon heating. The liquid material must not, however, be excessively acidic in reaction since acidic materials tend if present in too large quantities to dissolve the solid material, and the present invention contemplates only a method wherein a compact mass comprising undissolved solid material is hardened by heating. Formalin, as referred to in the present specification, is intended to indicate an aqueous solution of formaldehyde. Formalin generally contains about 40 percent formaldehyde, but other concentrations can be used.

The heating of the compact mass of wetted solid particles is preferably conducted in a manner allowing escape of evolved vapors from the compact mass and allowing expansion of the compact mass. Preferred ways of heating the compact mass include heating, as in an oven or water bath, the compact mass in a container which is open to the atmosphere so that the vapors can escape to atmosphere through the opening.

The temperature to which the mass is heated according to the invention can be any temperature suitable for causing condensation of the solid urea or thiourea with the formalin or furfural. Condensation temperatures for the combinations of reactants contemplated by the present invention are known in the art. Preferred temperatures are those within the approximate range 50–150° C. Temperatures higher than 150° C. are preferably not used, since they tend to cause too rapid evolution of the liquid material from the compact mass.

Hollow cylindrical products can be made according to the present invention by compacting solid particles wetted with liquid material in the annular space between a cylindrical mold and a cylindrical core centrally placed in the mold, and heating as previously described to give the mass a porous structure and harden the mass.

Rigid solid materials prepared according to the present invention generally have one surface which is uneven, since the compact mass used to prepare the rigid solid is permitted to swell toward that surface during heating. Accordingly, it may be necessary, before using the rigid solid product, to smooth the uneven surface. This can be accomplished for example, by smoothing on a carborundum wheel or by other suitable means. The products are generally mechanically strong enough to stand up satisfactorily under such smoothing operations and under other operations which place a comparable degree of strain on the product.

The following examples illustrate the preparation of rigid porous solids according to the invention.

Example I

In this example, a rigid, porous solid material was prepared from thiourea and formalin. The thiourea used was a mixture of particles, all of which were small enough to pass a 10 mesh screen and a major proportion of which were small enough to pass a 20 mesh screen. The U. S. Standard screen analysis of the thiourea is given as follows:

| Weight Percent | Passes— | Is Retained On— |
|---|---|---|
| 2.0 | 10 | 16 |
| 0.8 | 16 | 20 |
| 69.1 | 20 | 40 |
| 16.9 | 40 | 70 |
| 1.8 | 70 | 80 |
| 2.8 | 80 | 100 |
| 2.4 | 100 | 140 |
| 1.1 | 140 | 170 |
| 1.7 | 170 | 230 |
| 1.2 | 230 | |
| 0.2 | Lost in screening. | |
| 100.0 | | |

One part by weight of thiourea conforming substantially to the above was agitated with 0.75 part by weight of commercial grade formalin (40 percent formaldehyde) and the resulting mixture was filtered with suction through a bed of sand contained in a crucible to obtain on top of the sand bed, a filter cake comprising particles of thiourea in a compact mass wetted with formalin. The crucible and filter cake were heated to 100° C. for 80 hours in an oven, thereby converting the filter cake to a hard rigid solid material having porous structure visible to the unaided eye and having good mechanical strength.

This example shows that compact masses of thiourea particles can be treated according to the method of the present invention to give a rigid porous solid product.

Example II

In this example, a rigid porous solid material was prepared from thiourea and furfural. The thiourea used was a mixture of particles substantially conforming to the mixture used in Example I. One part by weight of such thiourea was agitated with one part by weight of furfural, and the resulting mixture was filtered through sand to give a filter cake which was then heated in oven at 100° C. for 18 hours. The filter cake was converted to a rigid porous solid material having good mechanical strength.

This example shows that compact masses of thiourea particles wetted with furfural can be treated according to the method of the present invention to give a rigid porous solid product.

Example III

Rigid porous solid materials were prepared from urea and formalin and from urea and furfural in a manner essentially the same as that described in Examples I and II. The products obtained were similar to those obtained using thiourea instead of urea.

In the method of the present invention the compact mass which is cured by heat contains solid amine which has not been condensed with formaline or furfural to any substantial degree of condensation beyond the slight degree which occurs, without heating, upon contact of the solid material with the formalin or furfural. That is, substantially all the condensation required to convert solid amine particles to hardened amine-aldehyde resin takes place after the compact mass of solid amine particles wetted with formalin or furfural has been formed.

In my copending application Serial No. 212,692 filed February 24, 1951, there is disclosed and claimed a method of making a rigid porous solid material by condensing by heat a compact mass of melamine particles wetted with formalin substantially in the absence of compression of the compact mass.

In my copending application Serial No. 212,691 filed February 24, 1951, now Patent No. 2,649,159, issued August 18, 1953, there is disclosed and claimed a method of sealing porous subterranean formations traversed by a borehole by introducing into the borehole a suspension of, for example, urea, or thiourea, in a liquid material such as formalin or furfural, forcing the suspension into the porous formation thereby to filter out a layer at the face of the porous formation, which layer comprises a compact mass of solid amine particles wetted with formalin or furfural, and then allowing the compact mass to harden under elevated temperature and pressure to form a hard rigid solid sheath sealing off the porous formation. The hardening step of the above method is similar to the hardening step of the present invention, except that it is conducted under differential pressure and under conditions to substantially compress the compact mass during hardening. With pressure exerted on the compact mass, the hardening step of the method disclosed and claimed in the above-identified copending application results in a hard solid which is substantially impermeable.

Products obtained according to the present invention are, by virtue of their porosity and ability to be formed into suitable shapes, useful as diffusion screens in mass diffusion or gas diffusion operations. Care should be taken however, in using products according to the invention, to avoid leaving them in contact with liquid water for substantial periods of time, since liquid water tends to disintegrate such products upon prolonged contact therewith.

Products obtained according to the present invention are also useful as insulating material.

Where formalin and furfural are disclosed in the present application, it is to be understood that other liquid aldehydes condensible with the solid material employed to form a thermosetting resin can be used in their place.

I claim:

1. The method for making a rigid, porous, solid material which comprises; filtering a suspension of solid particles selected from the group consisting of urea and thiourea in a liquid comprising an aldehyde condensible with said solid particles to form a thermosetting resin, thereby to obtain a filter cake comprising a compact mass of said solid particles wetted with said liquid; condensing said filter cake by heat under pressure not substantially exceeding atmospheric pressure, thereby to react said particles with said aldehyde to form resinous material and to harden said resinous material to bind said filter cake into a rigid, porous solid material.

2. Method according to claim 1 wherein said solid particles are a mixture of particles, a major proportion of which are small enough to pass a 10 mesh U. S. Standard screen.

3. Method according to claim 1 wherein said condensing by heat is carried out at a temperature within the approximate range 50° C. to 150° C.

4. Method according to claim 1 wherein said solid particles are a mixture of thiourea particles a major proportion of which are small enough to pass a 20 mesh U. S. Standard screen.

5. Method according to claim 1 wherein said aldehyde is formalin.

6. Method according to claim 1 wherein said aldehyde is furfural.

7. Method according to claim 1 wherein said particles comprise urea.

8. Method according to claim 1 wherein said particles comprise thiourea.

References Cited in the file of this patent

UNITED STATES PATENTS

| | | |
|---|---|---|
| 2,559,162 | Kurtz et al. | July 3, 1951 |
| 2,562,867 | Kurtz et al. | July 31, 1951 |
| 2,611,750 | White | Sept. 23, 1952 |